Aug. 27, 1935.　　　W. H. SILVER　　　2,012,457
AGRICULTURAL IMPLEMENT
Filed July 16, 1932　　　2 Sheets-Sheet 1
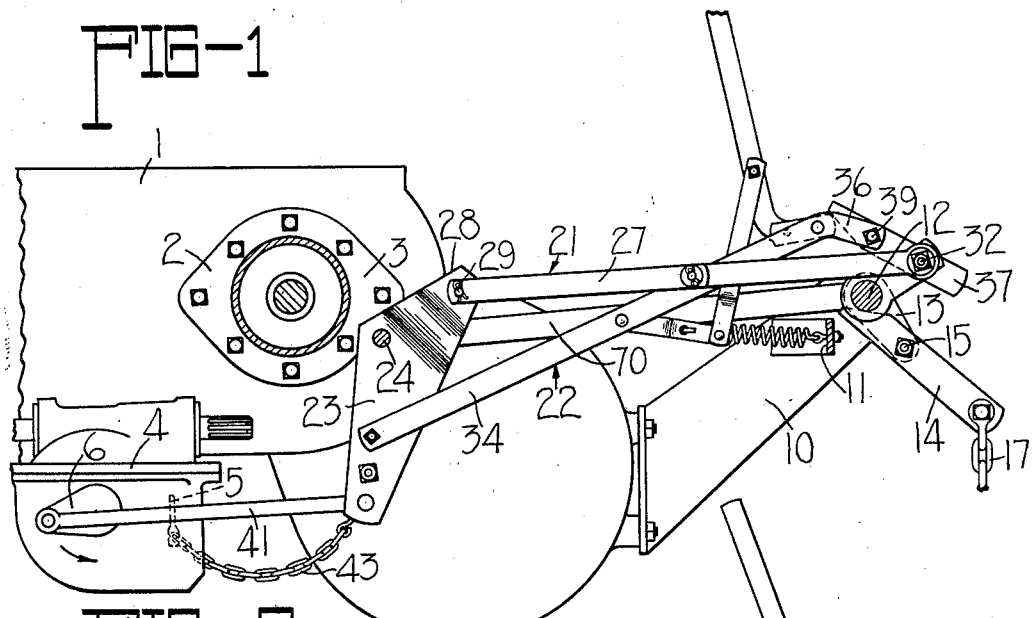
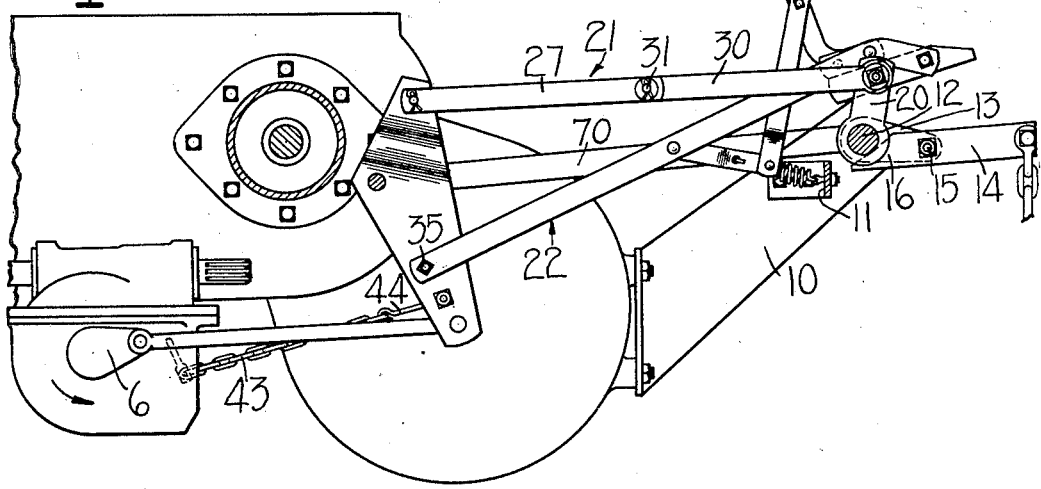
WITNESS.
Edward Melin
INVENTOR.
Walter H. Silver
BY Brown, Jackson
Boettcher & Dienner
ATTORNEYS.

Aug. 27, 1935.   W. H. SILVER   2,012,457
AGRICULTURAL IMPLEMENT
Filed July 16, 1932   2 Sheets-Sheet 2
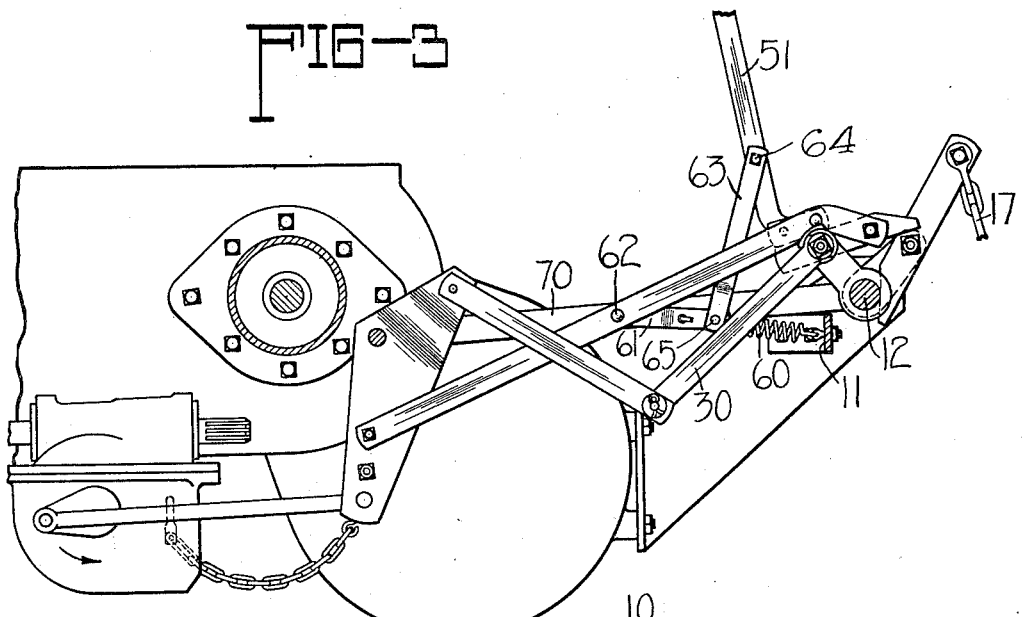
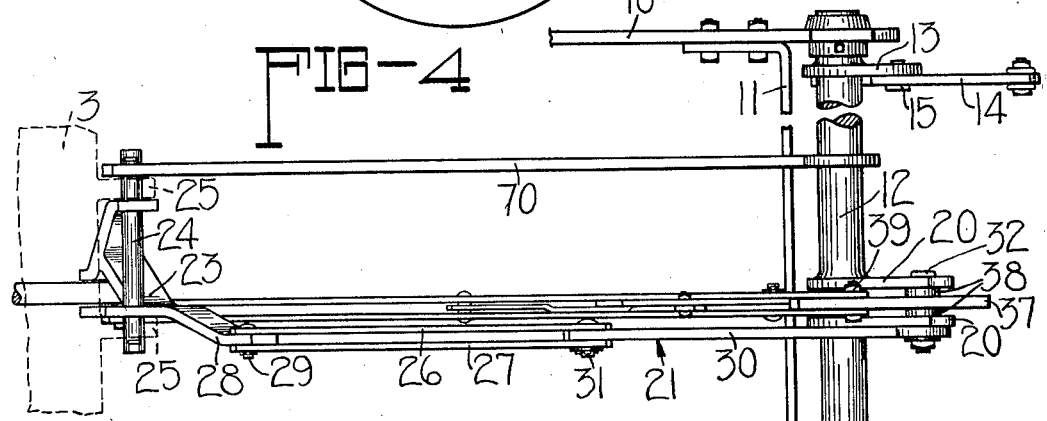
INVENTOR.
Walter H. Silver
BY Brown, Jackson
Boettcher & Diemer
ATTORNEYS.
WITNESS.
Edward Melin.

Patented Aug. 27, 1935

2,012,457

UNITED STATES PATENT OFFICE 2,012,457

AGRICULTURAL IMPLEMENT

Walter H. Silver, Moline, Ill., assignor to Deere & Company, Moline, Ill., a corporation of Illinois Application July 16, 1932, Serial No. 622,869

20 Claims. (Cl. 97—50)

The present invention relates to agricultural implements of the tractor driven type, and has as its general object to provide an improved arrangement for utilizing power derived from the engine of the tractor for performing secondary operation at the implement in addition to the primary operation of propelling the same.

It is common practice in agricultural implements to attach soil engaging tools such as plows and listers directly to the tractor. Such implements must be raised out of the ground frequently, and it is common practice to provide a power lift for this purpose, this lift utilizing power derived from the engine of the tractor to lift the tool or tools out of engagement with the ground.

A power lift of this kind is frequently provided with a half-revolution clutch which functions to drive a shaft through one-half a revolution each time the clutch mechanism is operated. This shaft is provided with a suitable crank by which the lifting mechanism is operated.

In certain agricultural implements the soil engaging tools must be raised rather high in order to clear the ground. In order that these tools may be lifted with a single one-half revolution operation of the power take-off shaft, a high movement gain leverage system must be employed. It frequently happens that the load placed upon the half-revolution clutch mechanis under these conditions is so great that the mechanism will not function properly to lift the soil engaging implement under adverse conditions. In certain other implements, such as for example a three bottom lister which is equipped with seed cans and fertilizer cans mounted directly upon the beam frame, the dead weight load of the lister is sufficiently great to overload the clutch even though the amount of lifting movement is not great.

The mechanism of my invention is adapted to fit between a conventional half-revolution clutch and the implement lifting device to enable that device to lift heavy implements under the conditions above pointed out without overloading the clutch mechanism.

In its preferred form, my invention incorporates a rock shaft journaled upon the tractor and equipped with suitable levers which function to lift the implement. This rock shaft is connected to the crank arm upon the shaft of the half revolution clutch by a system of levers which function to move the rock shaft in a forward or lifting direction during a one-half revolution of the clutch shaft, and to continue the movement of the rock shaft in the same direction during the succeeding half-revolution movement of the clutch shaft. By this arrangement two movements of the clutch shaft are utilized to produce the movement of the rock shaft which is required to properly lift the soil engaging tools of the implement. Since the clutch mechanism travels twice as far as the clutch mechanisms of the prior art have traveled during a single lifting operation, that is to say, through a complete revolution, the leverage of the means connecting the clutch to the lifting arms can be small enough to prevent overloading the clutch mechanism under the most adverse conditions.

Half-revolution clutch mechanisms of conventional type are provided with a control lever which is operated to start the functioning of the clutch. When once started the clutch will drive its shaft through one-half a revolution and then stop. The device of my invention may be conveniently provided with an arrangement for reoperating the clutch control lever at the end of this first one-half revolution of movement of the clutch shaft, so that the clutch will automatically continue in its movement through a second one-half revolution. With an arrangement of this kind, the clutch, when once tripped, will function to automatically raise the implement to its maximum height. The means for automatically reoperating the clutch control lever may be omitted, in which case an operation of the lever will control the clutch to raise the implement only half way, and the control lever must be reoperated manually to complete the lifting operation. An arrangement of this kind is advantageous where fractional elevation of the soil engaging tools is desired.

The shafts of half-revolution clutches are locked in place, when at rest, and the mechanism of my invention locks the rock shaft to the clutch shaft. The soil engaging tools of the implement are thus locked in their raised or transport position, and are not liable to fall to their soil engaging position should the implement strike an obstruction. Simple unlocking means are provided to unlock the tools and permit them to return to their soil engaging positions independently of the clutch mechanism.

My invention will be best understood by reference to the accompanying drawings in which a preferred embodiment of it is shown by way of example and in which:

Figure 1 is a fragmentary view of a tractor with the device of my invention attached thereto and shown in its normal position;

Figure 2 is a view similar to Figure 1 showing the device of my invention in its half operated position;

Figure 3 is a view similar to Figures 1 and 2 and showing the device in its fully operated position;

Figure 4 is a fragmentary plan view of the device of my invention;

Figure 5 is a fragmentary end elevational view of the device viewed from the left tractor or end, as seen in Figure 4; and Figure 6 is a diagrammatic view showing the connection of the levers to the rock shaft of the device.

Referring now to the drawings in more detail, the tractor, indicated generally at 1, comprises a differential casing 2 and a drive chain casing 3, and a clutch casing 4 which houses a conventional half-revolution clutch. The tractor and half-revolution clutch are not a part of the present invention and may be any conventional type of device, such as for example the tractor and clutch mechanism shown in the patent to Brown and Murray, No. 1,933,539, issued November 7, 1933. The clutch is provided with a control lever 5 and when this lever is operated the clutch functions to drive its shaft, and the crank arm 6 carried thereby, through one-half a revolution in the direction shown by the arrow. The clutch automatically stops at the completion of this movement.

A pair of brackets 10 are fixed upon the driving chain housing 3 of the tractor, which thus serves as a supporting frame carrying the brackets and associated parts, and the brackets extend upwardly and to the rear of that housing. Preferably these brackets are attached by bolts or stud screws so that they may be removed conveniently. The free ends of the bracket members 10 are connected together by a suitable brace member 11, and a rock shaft 12 is journaled in the free ends of the members 10, adjacent this brace. A crank arm 13 is fixed upon the shaft 12 so as to be keyed against rotation around the axis of that shaft. An implement raising lever 14 is attached to the crank arm by a suitable pivot 15 about which the levers can rotate. The end 16 of the lever 14 extends beyond the pivot pin toward the shaft 12, and is shaped to engage that shaft and thereby restrict the movement of the lever 14 about the pivot. The free end of the lever 14 carries suitable implement lifting means, such as the chain 17, by which the soil engaging tools 18, pivotally or otherwise attached to the tractor, are raised as the shaft 12 is rotated. When the chain 17 is placed in tension the end 16 of the lever strikes against the shaft 12 to prevent rotation of the lever 14 about its pivot 15 and a movement of the crank arm 13 upwardly must raise the chain and implement. Should the implement rise of its own accord sufficiently far to engage the lever 14, that lever will rotate about its pivot to bring its end 16 away from the shaft 12 to thereby prevent such movement of the implement from damaging the power lift equipment. The shaft 12 may be equipped with as many crank arms 13 and levers 14 as may be required to connect the power lift mechanism to the soil engaging tools of the implement.

A pair of crank arms 20 are fixed upon shaft 12 and spaced apart thereon to receive the articulated levers 21 and 22 by which the shaft 12 is moved. The opposite ends of the levers 21 and 22 are connected to an oscillatory member 23 which is journaled upon a pivot pin 24 on the tractor. As shown, the pivot pin 24 is journaled in suitable bosses 25 on the differential casing 3 of the tractor.

Lever 21 preferably comprises two bars or links 26 and 27 which are pivotally attached to opposite sides of the upper portion 28 of the member 23 by a suitable pivot pin 29, and a single bar or link 30, fitted between the free ends of the members 26 and 27 and pivotally attached thereto by a suitable pivot pin 31. The opposite end of this link 30 is attached to the crank arms 20 on the shaft 12 by a suitable bolt 32. The member 30 is preferably disposed on the outside face of one of the crank arms.

A toggle lever 22 comprises two bars or links 33 and 34 which are disposed on opposite sides of the lower portion of the member 23 and pivotally secured thereto by a suitable pivot pin 35. The links 33 and 34 are offset at 36, making them somewhat L-shaped. Toggle lever 22 includes a short bar or link 37 pivotally mounted upon the bolt 32 in the crank arm member 20 and centered between these arms by suitable spacers 38. The free end of the link 37 is disposed between the offset portions 36 of the links 34 and pivotally attached thereto by suitable pivot means 39. As will be seen in Figure 6 the pivot pin 39 projects through snug fit openings in the members 33 and 34 and through a slot 40 in the link 37 so that the offset portion 36 of the member 34 is capable of limited movement longitudinally of the link 37.

The lowermost portion of the oscillatory member 23 is connected to the crank arm 6 of the tractor clutch mechanism by a tie rod 41 which is pivotally connected to the members that it connects. As will be seen in Figure 5 the member 23 is preferably a casting shaped with parallel arms at its lower portion and the tie rod 41 is fitted between these parallel arms. Obviously this construction may be varied if desired.

In the operation of the device, when the clutch control lever 5 is tripped to start the clutch in operation, crank arm 6 is moved in the direction of the arrow from the position in which it is shown in Figure 1. Tie rod 41 acts in compression to rotate the oscillatory member 23 in a counterclockwise direction about its pivot 24. This movement of the member 23 places the lever 21 in tension to move the free end of the crank arms 20 to the left as viewed in Figure 1. This rotates the crank shaft 12 in a counterclockwise direction about its axis. This movement stops when the crank arm 6 of the clutch has moved through one-half a revolution into the position in which it is shown in Figure 2, at which time member 23 and the crank arms 20 on the rock shaft will be in the positions in which they are shown in Figure 2.

During this counterclockwise movement of the member 23 toggle lever 22 is placed in compression to rotate the link 37 in a clockwise direction about the pivot pin 32 from the position in which it is shown in Figure 1 into the locked relation in which it is shown in Figure 2. Owing to the offset 36 in the members 33 and 34 of the lever 22, the pivot pin 39 by which members 33 and 34 are connected to the link 37 is moved in a clockwise direction beyond a line intersecting the pivot pins 32 and 35. That is to say the clockwise movement of the link 37 is continued until the pivotal connection between that link and the members 33 and 34 moves past position of alignment of the pivotal axes. Lever 22 is not stressed in compression by this movement. With the parts of the mechanism properly proportioned and centered, this movement is sufficient only to move the link 37 from the position in which it is shown in Figure 1 to the position in which it is shown in Figure 2. Any excess movement, which may occur, causes the pivot 39 to slide in the slot 40, and stressing of the lever 22 is thus prevented.

As soon as the crank arm 6 of the clutch mechanism has reached the position in which it is shown in Figure 2, that clutch functions to stop further movement of the arm until the control lever 5 is reoperated. This reoperation of the control lever may be accomplished manually, in implements in which half elevation of the soil engaging tools may be desirable, or the operation may be automatically performed in the manner shown in the drawings. A chain 43 is secured to the free end of the control lever 5 and also secured to a suitable ring bolt 44 carried upon the lower end of the oscillatory member 23, adjacent the pivotal connection of the rod 41 thereto. Bolt 44 may conveniently be threaded through the eye of an eye bolt 45 carried upon the member 23 and secured thereagainst by a nut 46 threaded upon the bolt 44. This nut is adjusted on the bolt to adjust the length of the chain 43 so that as the member 23 moves into the position in which it is shown in Figure 2 chain 43 will be tightened to move the control lever 5 out of the normal position in which it is shown in Figure 1 into the operated position in which it is shown in Figure 2. This movement of the control lever 5 operates the clutch mechanism to cause it to drive the crank arm 6 through another half revolution from the position in which it is shown in Figure 2 into the position in which it is shown in Figure 3.

The movement of the crank arm 6 of the clutch during the second one-half revolution places tie rod 41 in tension to move the member 23 in a clockwise direction around the pivot pin 24. This movement of the member 23 removes the tension from the lever 21 and places the lever in compression, which serves to flex the lever, at the pivot pin 31 connecting the two sections of it, and to move the lever into the position in which it is shown in Figure 3.

This movement of the member 23 places lever 22 partly in tension and partly in compression. Links 33 and 34 of the lever are placed in tension to place link 37 in compression through the pivot pin 39. The line of tension in the links 33 and 34 extends between the pivot pin 32 and the axis of the shaft 12 and tends to rotate the link 37 in a clockwise direction about the pivot pin 32. The projecting end 48 of the lever 37 strikes against a plate 49 carried between the members 33 and 34 to prevent further rotation of the link 37. This link therefore acts in compression to move the pivot pin 32 and crank arms 20 to the left, Figure 2, so that shaft 12 is rotated in a counterclockwise direction about its axis into the position in which it is shown in Figure 3. This movement of the shaft raises the chains 17 and the soil engaging tools of the implement are thereby raised.

The clockwise movement of the oscillatory member 23 removes the tension from the chain 43 and permits the control lever 5 of the clutch mechanism to be restored to its normal position and the clutch functions to bring the crank arm 6 to rest when it has reached the position in which it is shown in Figure 3. The clutch mechanism definitely locks the crank arm 6 in position, and the rock shaft 12 is thereby locked in its operated position.

A lever 51 is provided to unlock the rock shaft to permit the weight of the implements attached to chains 17 to restore the power lift devices to their normal position independently of the clutch. This lever 51 is generally L-shaped and is disposed between the members 33 and 34 of the lever 22 and pivoted thereto at 52. The lever 51 is made of stock which is considerably thinner than the distance between the members 33 and 34 and a filler 49 is attached to the lever to build up the bent end portion thereof to a thickness substantially to the thickness of the link 37. To unlock the power lift mechanism the upstanding end of lever 51 is moved forward, that is toward the tractor, to thereby move the bent end portion of the lever in a counterclockwise direction about the pivot pin 52. This causes the filler plate 49 to bear down upon the projecting end 48 of the link 37 and to rotate that link in a counterclockwise direction about the pivot pin 32 by which it is mounted upon the crank arm 20. This raises the pivotal connection 39 between the crank 37 and members 33 and 34 sufficiently to bring the line of tension in members 33 and 34 above pivot pin 32 to thereby unlock the lever. The weight of the soil engaging tools acts upon chains 17 and the lever 14 to revolve the rock shaft 12 in a counterclockwise direction into its normal position, as shown in Figure 1.

This clockwise movement of the counter shaft 12 moves the link 37 in a counterclockwise direction about the pivot pin 32, and these movements are limited by a projecting end 53 of the link 37. This end strikes against the end of the lever 51 and filler plate 49 carried thereby, to prevent further relative movement between the links 33 and 34 and the link 37.

In order to prevent the weight of the lever 51 from unlocking the mechanism I have provided a spring 60 which is fixed at one end to the brace member 11 that extends between the main mounting brackets of the mechanism. The opposite end of this spring 60 is connected by a link 61 to the members 33 and 34 through a pivot pin 62. A thrust link 63 is pivotally connected at 64 to the lever 51 and pivotally connected to the link 61 at 65. Tension in the spring 60 tends to raise the thrust link 63 and thereby lift the weight of the lever 51 off of the projecting end 48 of the link 37. Spring 60 is tensioned by a forward movement of the lever 51 during the operation of unlocking the rock shaft, and this tension serves to restore the lever to its normal position immediately upon release of the same. When the levers 21 and 22 are in the position in which they are shown in Figure 1, the overhanging portion 48 of the link 37 does not engage the link 51 and that lever is prevented from rotating about the pivot pin 52 solely by the tension of spring 60.

The tension placed upon the rock shaft 12 by the levers 21 and 22, when lifting a heavy implement under adverse conditions, may be sufficient to bend the shaft 12. To guard against a contingency of this kind I have provided a tie 70 which is journaled upon the shaft and registered with the pivot pin 24.

While I have chosen to illustrate my invention by describing a preferred embodiment of it I have done so by way of example only as there are many modifications and adaptations which can be made within the teachings of the invention.

What is claimed is:

1. In combination, a shaft journaled for rotation, a crank arm on said shaft, an oscillatory member adjacent said shaft, means for oscillating said member, an articulated lever connecting said crank arm to one end of said member, said lever acting in tension to cause a movement of said member in one direction to move the shaft in one direction, a second articulated lever connecting the other end of said member to said crank arm, a lost motion connection included in said second lever, said second lever having its elements arranged to collapse when subjected to compression during said first movement of said member and said elements being arranged to act in tension during a second movement of the member to continue the movement of said shaft in said one direction.

2. In combination, a shaft, a crank arm thereon, a half revolution clutch mechanism for revolving said shaft through half a revolution each time the clutch is operated, a lever pivotally mounted adjacent to said shaft, a bar connecting said arm to said lever, said bar acting in compression during one-half revolution of said shaft to move said lever about its pivot in one direction and acting in tension during the next one-half revolution of said shaft to move said lever about its pivot in the opposite direction, a rock shaft, a crank arm on said rock shaft, a pair of multi-section link members connecting opposite ends of said lever to said rock shaft crank arm, the sections of one of said link members being connected together whereby said member is capable of acting in tension during said first movement of said lever to move said rock shaft in one direction, and the other one of said link members having one section thereof acting in tension and another section thereof acting in compression during said second movement of said lever to move said rock shaft in the same direction.

3. In combination, a shaft, a clutch for driving said shaft through one-half a revolution each time the clutch is operated, means for controlling said clutch, a crank arm on said shaft, a pivoted lever, a bar connecting one end of said lever to said crank arm, a rock shaft, a crank arm on said rock shaft, a first link pivoted to said crank arm, a second link pivoted to the end of said lever opposite said bar, means pivotally connecting the free ends of said first and second links, a third link pivoted to the free end of said rock shaft crank arm, an L-shaped link pivoted to said lever adjacent said bar, and pivotal means connecting the free end of said L-shaped link to the free end of said third link, said first and second links acting in tension during a first one-half revolution of said clutch shaft to move the rock shaft in one direction and to move said L link and third link so that a line of tension between the pivotal means at the ends of said L link passes between the pivotal connection of said third link and said rock shaft, said L link then acting in tension, and said third link in compression during a second one-half revolution of said clutch shaft to move said rock shaft in the same direction.

4. The combination with a clutch having a shaft which is driven through one-half a revolution each time the clutch is operated, of a rock shaft, means connected between said shafts and including a pair of serially connected links acting in tension during a first one-half revolution of said clutch shaft to move said rock shaft in one direction, said means including a second pair of serially connected links acting in tension and compression respectively during a second one-half revolution of said clutch shaft to move said rock shaft in the same direction, said second links being movable to a position relative to one another to hold said rock shaft against further movement at the completion of the second one-half revolution of said clutch, and means for moving the second links out of holding position to allow said pairs of links and said rock shaft to move in an opposite direction independently of said clutch.

5. The combination with a fractional revolution clutch having a control lever and a shaft adapted to be driven through one-half a revolution by the clutch each time said lever is operated, of a rock shaft journaled to turn around a stationary axis, a lever pivoted in juxtaposition to said shaft, a crank arm on said clutch shaft, a link connecting said arm to said lever to oscillate the same about its pivot responsive to a movement of said clutch shaft, means on said lever for operating said clutch control lever at the end of the first half revolution of said clutch shaft to cause the clutch to drive the clutch shaft through a second half revolution, and means connecting said lever to said rock shaft whereby the rock shaft is moved in one direction responsive to an oscillation of the lever.

6. The combination with a tractor having a half revolution clutch, of a pair of brackets mounted upon said tractor, a rock shaft journaled in said brackets, an oscillatory member pivoted to said tractor between said clutch and rock shaft, means connecting said member to said clutch for causing an operation of the clutch to oscillate the member, means connecting said member to said shaft whereby an oscillation of the member forward and back moves the rock shaft forward, and a brace extending between the pivot of said member and said rock shaft to prevent bending of the rock shaft by said latter means.

7. The combination with a tractor having a half revolution clutch, of a pair of brackets mounted upon said tractor, a rock shaft journaled in said brackets, an oscillatory member pivoted to said tractor between said clutch and rock shaft, means connecting said member to said clutch for causing an operation of the clutch to oscillate the member, means connecting said member to said shaft for causing an operation of the clutch to oscillate the member, means connecting said member to said clutch whereby an oscillation of the member forward and back moves the rock shaft forward, a brace extending between the pivot of said member and said rock shaft to prevent bending of the rock shaft by said latter means, and implement raising means on said rock shaft raised by said forward movement of the shaft.

8. The combination with a tractor having a half revolution clutch, of a pair of brackets mounted upon said tractor, a rock shaft journaled in said brackets, an oscillatory member pivoted to said tractor between said clutch and rock shaft, means connecting said member to said clutch for causing an operation of the clutch to oscillate the member, means connecting said member to said shaft whereby an oscillation of the member forward and back moves the rock shaft forward, a brace extending between the pivot of said member and said rock shaft to prevent bending of the rock shaft by said latter means, a crank arm on said rock shaft, a lever, a pivot connecting said lever to said crank arm, said lever extending past said pivot and engaging said shaft to limit the rotation of the lever about the pivot in one direction, and an implement raising link attached to the opposite end of said lever and raised thereby by a forward movement of said rock shaft.

9. The combination with a tractor, of a rock shaft mounted upon the tractor, a fractional revolution clutch on said tractor, a control lever for said clutch, and means including serially connected pivoted levers for connecting said shaft to said tractor through said clutch whereby the movement of said clutch responsive to a first operation of said control lever rocks the shaft in one direction and the movement of said clutch responsive to a second operation of said control lever rocks the shaft in the same direction.

10. The combination with a tractor, of a rock shaft mounted upon the tractor, a fractional revolution clutch on said tractor, a control lever for said clutch, means including serially connected pivoted levers for connecting said shaft to said tractor through said clutch whereby the movement of said clutch responsive to a first operation of said control lever rocks the shaft in one direction and the movement of said clutch responsive to a second operation of said control lever rocks the shaft in the same direction, and means carried by one of said levers for automatically performing said second operation of said control lever.

11. In combination, a rock shaft, an arm on said rock shaft, means for rocking said shaft in one direction to a certain position, said means being stressable in one direction only, a two element articulated link connected to said arm, said elements being arranged to collapse into an over-center relationship with respect to said arm during the movement of the rock shaft to said certain position, and means for applying pulling force to the free end of said link after said elements have collapsed whereby one element of said link acts in tension and the other element acts in compression to rock said shaft an additional amount in the same direction.

12. In combination, a rock shaft, an arm secured to said shaft, a first means stressable in one direction only for rocking said arm and shaft in one direction to one position, and a second means for rocking said arm and shaft in the same direction to a further position, said second means comprising an articulated link composed of two pivotally connected members, one of said members being pivotally connected with said arm, actuating means connected with the other of said members for exerting a pulling force upon the latter member after said arm has been moved to said one position, cooperative means carried by said members for locking the latter against relative pivotal movement when said arm and shaft are disposed in said one position, whereby the pulling force exerted upon said other member is transmitted through said one member to said arm to rotate the shaft to said further position.

13. The combination with a tractor having a clutch operated power take-off mechanism, of implement lifting means, means operated by said clutch mechanism for actuating said implement lifting means including link means operably associated with said lifting means and arranged to move into locked relation when said lifting means has been moved into its raised position to hold said lifting means in raised position, and trip means operatively connected with said link means to trip the latter out of locked relation.

14. The combination with a tractor having a clutch operated power take-off mechanism, of implement lifting means connected with said mechanism, link means associated with said lifting means and arranged to move into locked relation, trip means connected with said link means to trip the latter out of locked relation, and spring means connected with said link means and operative to yieldingly hold the latter in locked relation.

15. In combination, a rock shaft, an arm on said rock shaft, means for rocking said shaft in one direction to a certain position, said means being stressable in one direction only, a two-element articulated link connected to said arm, said elements being arranged to move into an over-center relationship with respect to said arm during the movement of the rock shaft to said certain position, and means for applying force to the free end of said link after said elements have been moved to said over-center relationship to rock said shaft an additional amount in the same direction.

16. An agricultural implement comprising a supporting frame, implement raising and lowering mechanism supported thereon including a rockably mounted member on the frame, a second member movably mounted with respect to the frame and adapted to be operatively connected with the implement part to be raised, and means comprising a pair of toggle links pivotally connected together and to said first and second members and operative when swung to an overcenter position by the movement of said members to a certain position to hold said members in that position to retain said mechanism in a raised position.

17. An agricultural implement comprising a supporting frame, a rockably mounted member on the frame, a second member movably mounted with respect to the frame and connected with said rockably mounted member for movement with respect thereto, implement lifting means connected with said second member, a pair of toggle links pivotally connected together by lost motion means and serving to operatively connect both of said members together, said toggle links being operative when swung to an overcenter position to transmit a force in one direction, means connecting one of said toggle links with one of said members for relative pivotal movement, spring means cooperating with one of said toggle links and tending to move said toggle links into said over-center position, and unlocking means connected with the other of said toggle links.

18. An agricultural implement comprising a supporting frame, a rockably mounted member on the frame, a second member movably mounted with respect to the frame and connected for movement with respect to said rockably mounted member, a pair of toggle links pivotally connected together by lost motion means and serving to connect both of said members, said toggle links being operative when swung to an over-center position to transmit a force in one direction, means connecting one of the toggle links with one of said members for relative pivotal movement, spring means cooperating with one of said toggle links and tending to move said toggle links into said position, operative means for shifting said rockably mounted member when said toggle links are locked, and means for shifting at least one of said toggle links against the bias of said spring means to provide for releasing said toggle links.

19. An agricultural implement comprising means serving as a supporting frame adapted to have an implement tool movably connected therewith for generally vertical movement, a rockably mounted member on the frame, a second member movably mounted with respect to the frame and adapted to be operatively connected with said implement tool to raise the same, and means comprising a pair of toggle links pivotally connected together and to both of said first and second members and operative when swung to an over-center position to hold said members against relative movement in at least one direction to retain said tool in a raised position.

20. The combination with a tractor having a clutch operated power take-off mechanism, of implement lifting means, link means operatively associated with said lifting means and arranged to move into a locked relation when the lifting means is moved to a certain position so as to hold the lifting means in that position, trip means operatively connected with said link means to trip the latter out of locked relation, and means connected with said power take-off mechanism and said lifting means for moving the latter to said certain position.

WALTER H. SILVER.